Aug. 31, 1965  C. W. TAYLOR, JR., ETAL  3,203,543
FILM PROTECTOR FOR TIRES
Filed July 20, 1962

INVENTOR.
CHARLES W. TAYLOR, JR.
VERNON R. CARR
BY
J.B. Holden
ATTORNEY

United States Patent Office 3,203,543
Patented Aug. 31, 1965

3,203,543
FILM PROTECTOR FOR TIRES
Charles W. Taylor, Jr., and Vernon R. Carr, Akron, Ohio, assignors to The Goodyear Tire & Rubber Company, Akron, Ohio, a corporation of Ohio
Filed July 20, 1962, Ser. No. 211,265
8 Claims. (Cl. 206—46)

This invention relates to a protective film covering for the sidewall of a pneumatic tire which is white or any other color. ("Color" is used herein to distinguish white and other colors from the usual black color of a tire.) The invention includes the process of protecting the tire and the apparatus used, as well as the protected tire.

In the manufacture of white-sidewall tires, it is customary to provide only one white sidewall, and if tires with red, etc. sidewalls get into production it is probable that only one of the sidewalls of each will be colored. Such tires are placed on automobiles with the colored sidewall exposed, the other sidewall being faced toward the chassis of the automobile.

Although it is customary to wrap white-sidewall tires entirely before shipment from the plant where they are manufactured, it is only the colored sidewall that need be protected, and the protective film of this invention covers only one sidewall. The film is annular, and of heat-stretchable composition. The inner edge is stretched under that bead of the tire which is adjacent the colored sidewall, and the outer edge is stretched into a groove in the tread adjacent that sidewall. This stretching is preferably done by confining the tire and subjecting the film to vacuum, as will be explained.

When the tire is to be used, the film is readily separated from the tire, by removing the one edge of the film from the groove and the other from around the bead. To facilitate this the film may be cut or torn in a general radial direction from edge to edge, or it may be cut or torn in a generally circular manner in the area of the sidewall and the resulting two pieces lifted away from each other. The film may be removed in any convenient manner.

By referring to the film as heat-stretchable, it is meant that when heated the film can be stretched, and then on cooling it will retain substantially its stretched dimensions. Suitable films are, for example, vinyl films, rubber hydrochloride film, polyester film, etc. The film is colorless and transparent. It is described as self supporting to distinguish it from an adherent film coating.

The invention is further described in connection with the accompanying drawings, in which—

Figure 1:
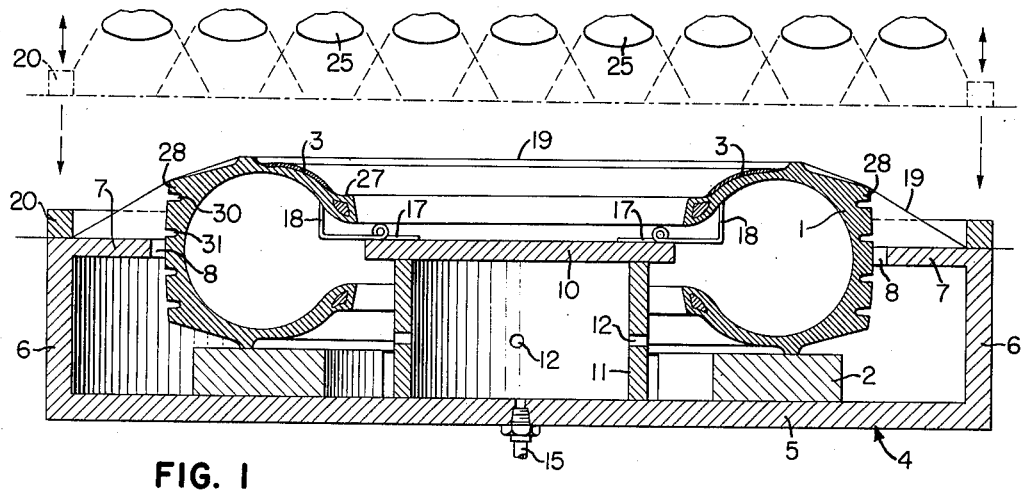
FIGURE 1 is a sectional view through the apparatus before drawing a vacuum.

The tire 1 is supported horizontally on any suitable means 2. The colored sidewall 3 faces up. The means 2, if annular must have openings through it so that the pressure is reduced uniformly on both sides of it when a vacuum is applied. It may be formed of several separate supports. The support means is located in a cup-shaped container 4 with an air-impervious bottom 5 and annular wall 6. The top is provided with an annular flange 7 which extends inwardly to the circular opening 8.

In the center of the container is the table 10 with a circular top. If the table support 11 is continuous it is provided with openings 12 so that the pressure is reduced uniformly on both sides of it. Alternatively, the table may be supported on a plurality of spaced legs. A vacuum connection 15 is located in any convenient place.

At the edge of the table are three or four or more hinged supports each of which comprises a stationary portion 17 and movable L-shaped part 18. The parts 18 are pivoted inwardly when the tire 1 is put in position on the support 2. Then the tire is lifted slightly, the parts 18 are thrown out to the position shown in the drawings, the tire is lowered on to supports 2, a piece of film 19 is placed over the tire and clamped in place by the clamping ring 20 or other suitable means which holds the film taut.

The film is then heated by suitable means, such as infra-red heaters 25 (FIGURE 1). It is not necessary to heat the entire film, and the heat may be directed to annular areas of the film above the top bead 27 and tread 28 of the tire. The tread may be of any design. It is shown as comprising a series of parallel grooves 30, 31, etc. The invention is most easily applied to a tire with a continuous groove near the edge of the tread, but is applicable even though it is necessary to stretch the film into depressions near the edge of the tread which do not form a continuous groove.

Figure 2:
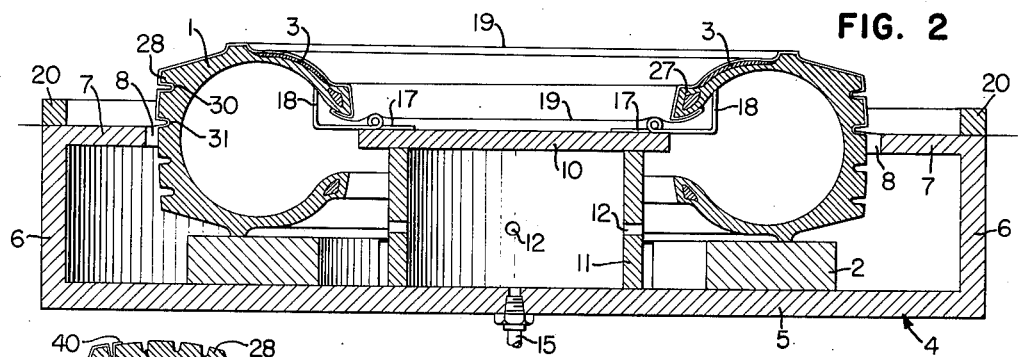
FIGURE 2 is an identical view except that the film has been stretched by a vacuum.
Figure 4:
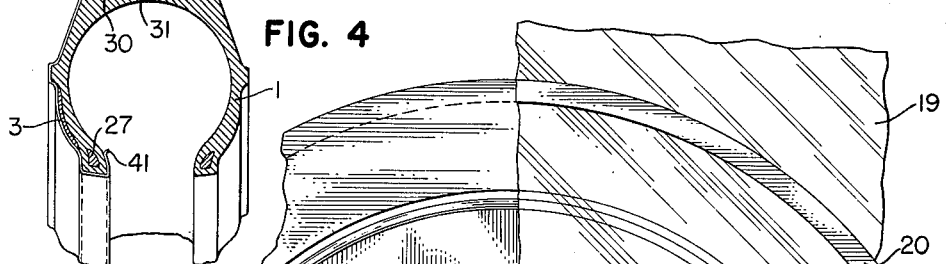
FIGURE 4 is a section through the protected tire.
Figure 3:
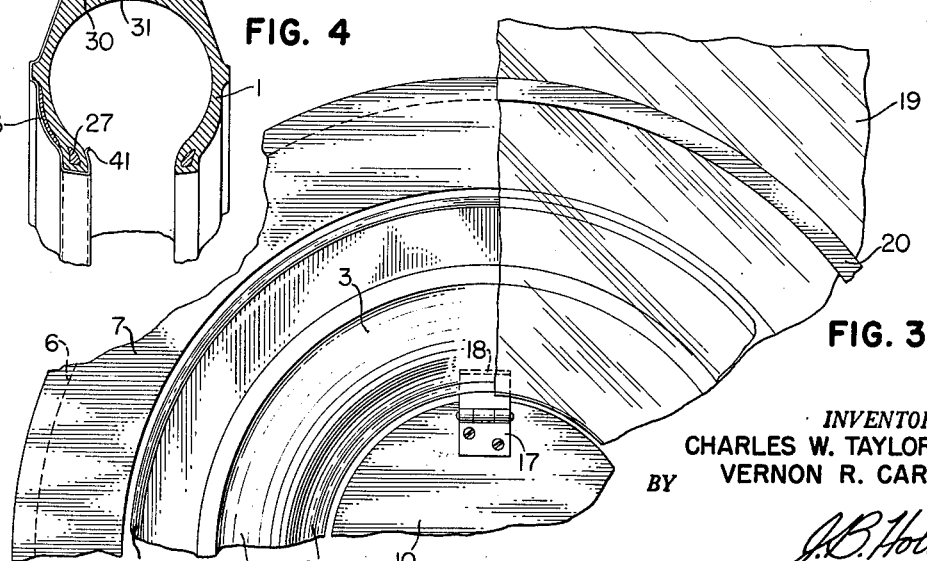
FIGURE 3 is an enlarged plan view of a part of the tire and equipment after drawing the vacuum and trimming away the unneeded center part of the film.

When the film has been heated to a temperature at which it is stretchable the vacuum is applied. This sucks the film back under the top bead 27 and by removing air from the grooves 30 and 31 the film is sucked down into them. (FIGURE 2.) Also, the inner edge of the film is sucked in at the bead, until it covers the bead. (FIGURE 2.) The whole side of the tire is thus covered from the bead to the tread. The film is allowed to cool until it sets. The ring 20 is then raised, the tire is replaced by a fresh tire which is covered with fresh film and the operation is repeated. The unneeded film is removed by cutting the film between grooves 30 and 31 to form the edge 40, and inside of the bead to form the edge 41. The film that is cut away is clean scrap and can be redissolved, spread into new film, and then used again on other tires.

The invention is covered in the claims which follow.

What we claim is:

1. In combination with a pneumatic tire with a colored sidewall, an annular self-supporting transparent film over the colored sidewall which film is separate from the tire and separably fastened directly to the tire at its inner edge adjacent that bead which is nearest said sidewall, and at its outer edge adjacent the edge of the tread.

2. In combination with a pneumatic tire with a colored sidewall and a groove in the tread near said sidewall, an annular, heat-stretchable, self-supporting, transparent, colorless film which is separate from the tire and covers the colored sidewall, the inner edge of the film being releasably held to the tire by being stretched around the bead adjacent said sidewall and its outer edge being releasably held to the tire by being stretched into said annular groove in the tread near said sidewall.

3. The method of covering the side of a pneumatic tire which has a colored sidewall and an annular groove in the tread near said sidewall, using heat-stretchable, self-supporting film, which method comprises covering said side of the tire with the film and heating the portion of the film which covers the bead on said side of the tire and the portion of the film which covers the portion of the tread near said sidewall, and by the use of different pressures on the respective sides of the film stretching said portions around the bead and into said groove, respectively; and then cooling the film and trimming away the areas of said film beyond the portions so stretched.

4. The method of covering the sidewall of a pneumatic tire with heat-stretchable, self-supporting film, which method comprises covering only one sidewall of the tire with the film and heating and stretching the edge of the film over the bead of the tire adjacent said sidewall.

5. The method of claim 4 in which the film is cooled after stretching, and then film inside the tire is cut away.

6. The method of covering the sidewall of a pneumatic tire with heat-stretchable, self-supporting film, the tire having an annular groove in the tread near the sidewall, which method comprises covering the sidewall of the tire with the film, and heating and stretching the film into the groove.

7. The method of claim 6 in which the film is cooled after stretching, and then film outside the portion in the groove is cut away.

8. Apparatus for protecting the sidewall of a tire with heat-stretchable film, which apparatus includes means for supporting a tire horizontally from below, an air-impervious enclosure enclosing the support and bottom of the tire, a connection for evacuating the enclosure, said enclosure having a circular opening therein just larger than the circumference of a tire when on the supporting means, means inside the top bead for supporting the top of the tire when in the opening, at least a part of the last-mentioned means being movable out of its tire-supporting position, and means outside the opening for holding film taut against the tire when in the opening.

References Cited by the Examiner

UNITED STATES PATENTS

| | | | |
|---|---|---|---|
| 2,648,613 | 8/53 | Shinkle | 117—6 |
| 2,690,593 | 10/54 | Abercrombie. | |
| 2,731,654 | 1/56 | Nowak. | |
| 2,828,799 | 4/58 | Harrison. | |
| 2,996,041 | 8/61 | Carpenter et al. | 118—505 |
| 3,024,579 | 3/62 | Stockhausen et al. | 53—22 |

FOREIGN PATENTS

| | | |
|---|---|---|
| 209,767 | 10/56 | Australia. |
| 757,103 | 9/56 | Great Britain. |

THERON E. CONDON, *Primary Examiner.*